United States Patent [19]

Fegley

[11] Patent Number: 4,479,549
[45] Date of Patent: Oct. 30, 1984

[54] GROUND WORKING IMPLEMENT

[75] Inventor: Richard L. Fegley, Ohio City, Ohio
[73] Assignee: Remlinger Manufacturing Co., Inc., Kalida, Ohio
[21] Appl. No.: 518,985
[22] Filed: Aug. 1, 1983
[51] Int. Cl.³ .................... A01B 63/22; A01B 63/32
[52] U.S. Cl. .................... 172/142; 172/398; 172/484; 172/311; 172/179; 172/244
[58] Field of Search ............... 172/326, 327, 328, 142, 172/179, 413, 483, 484, 311, 456, 397, 398, 244

[56] References Cited

U.S. PATENT DOCUMENTS

| | | | |
|---|---|---|---|
| 1,402,648 | 1/1922 | Pfanhauser | 172/398 X |
| 2,607,176 | 8/1952 | McVicar | 172/148 |
| 3,006,422 | 10/1961 | Mighell | 172/328 X |
| 3,054,462 | 9/1962 | Anderson | 172/310 |
| 3,126,689 | 3/1964 | Walker | 172/491 |
| 3,225,839 | 12/1965 | Petitt | 172/398 |
| 3,828,860 | 8/1974 | Poland | 172/456 |
| 4,180,005 | 12/1979 | Zumbahlen | 172/142 |
| 4,227,581 | 10/1980 | Klotzbach | 172/142 |
| 4,245,706 | 4/1984 | Dietrich | 172/140 |
| 4,371,039 | 2/1983 | Schaaf | 172/398 |
| 4,446,924 | 5/1984 | Dietrich | 172/140 |

*Primary Examiner*—Richard J. Johnson
*Attorney, Agent, or Firm*—John L. Gray

[57] ABSTRACT

A ground working implement is disclosed which comprises three rectangular frames connected together by means of hinges. A center frame is provided with a tongue for attachment to a traction device such as a tractor. Each of the frames is provided with a packer wheel attached to and extending along the rear portion thereof and each of the frames is also provided with a separate frame from which S tines depend. S tines are sometimes referred to as Danish tines. The separate frames are connected to the first frame by means of a bell crank which is fulcrumed on members depending from the first frame and which are connected together by means of levers which in turn are connected to a rotatable shaft. Each frame is provided with a rotatable shaft which are connected together for concurrent rotation by an articulated connection permitting the outermost frames to be rotated 180° by means of hydraulic cylinders and supported on the center frame for road transportation. A hydraulic cylinder is provided in the center frame which rotates the shaft on that frame to raise or lower the wheels used for road transportation. Lowering the wheels lifts both the packer wheels and the tines up to a safe distance above the ground level and brings the second frame closer to the first frame. The reverse of this movement of the hydraulic cylinder causes the wheels to raise and the packer wheels to rest on the ground. Further movement of the hydraulic cylinder determines the degree of vertical penetration into the ground on the part of the tines.

8 Claims, 5 Drawing Figures

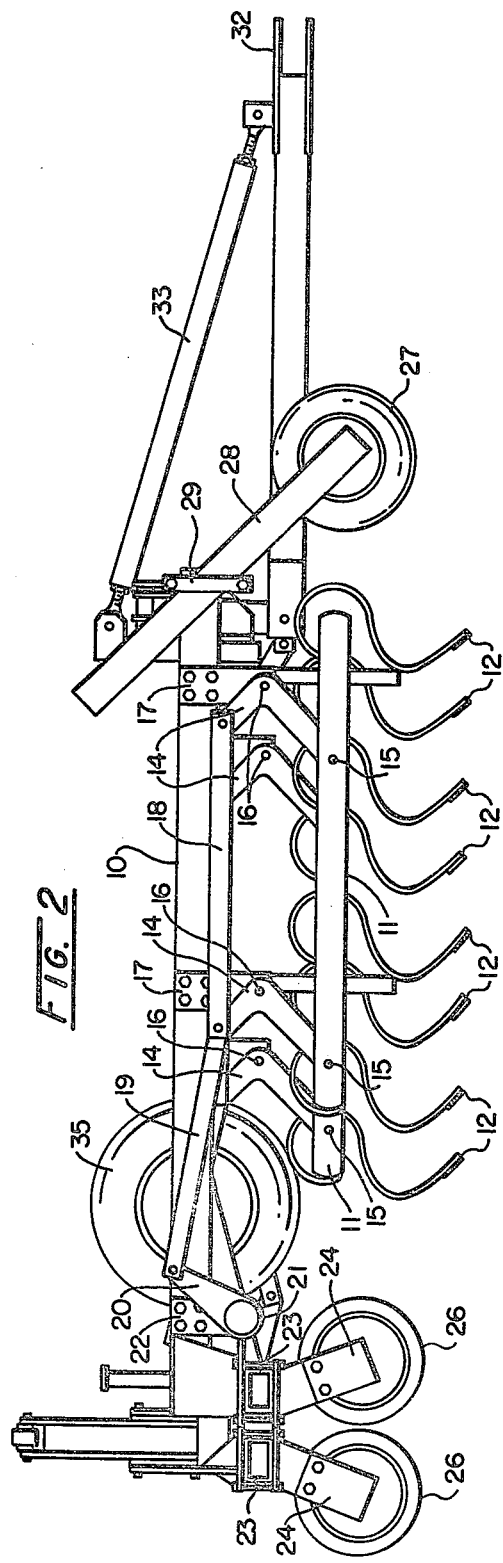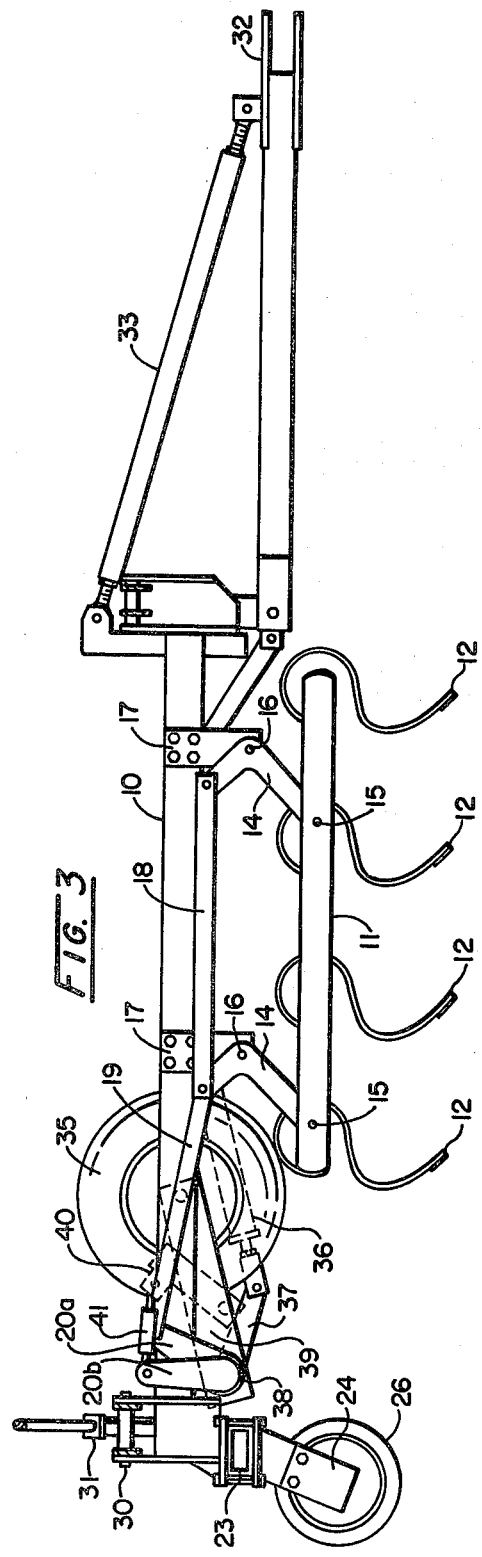

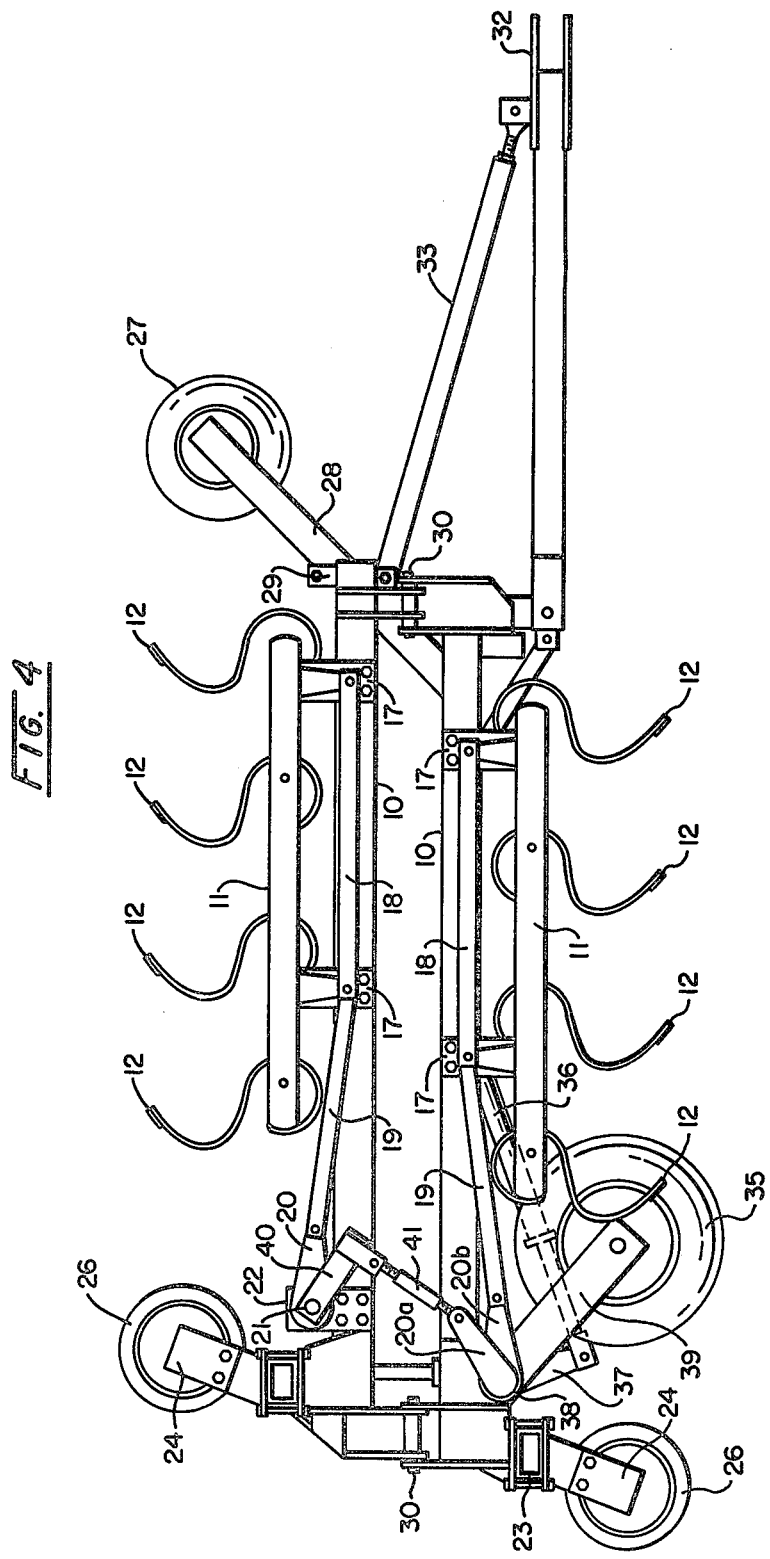

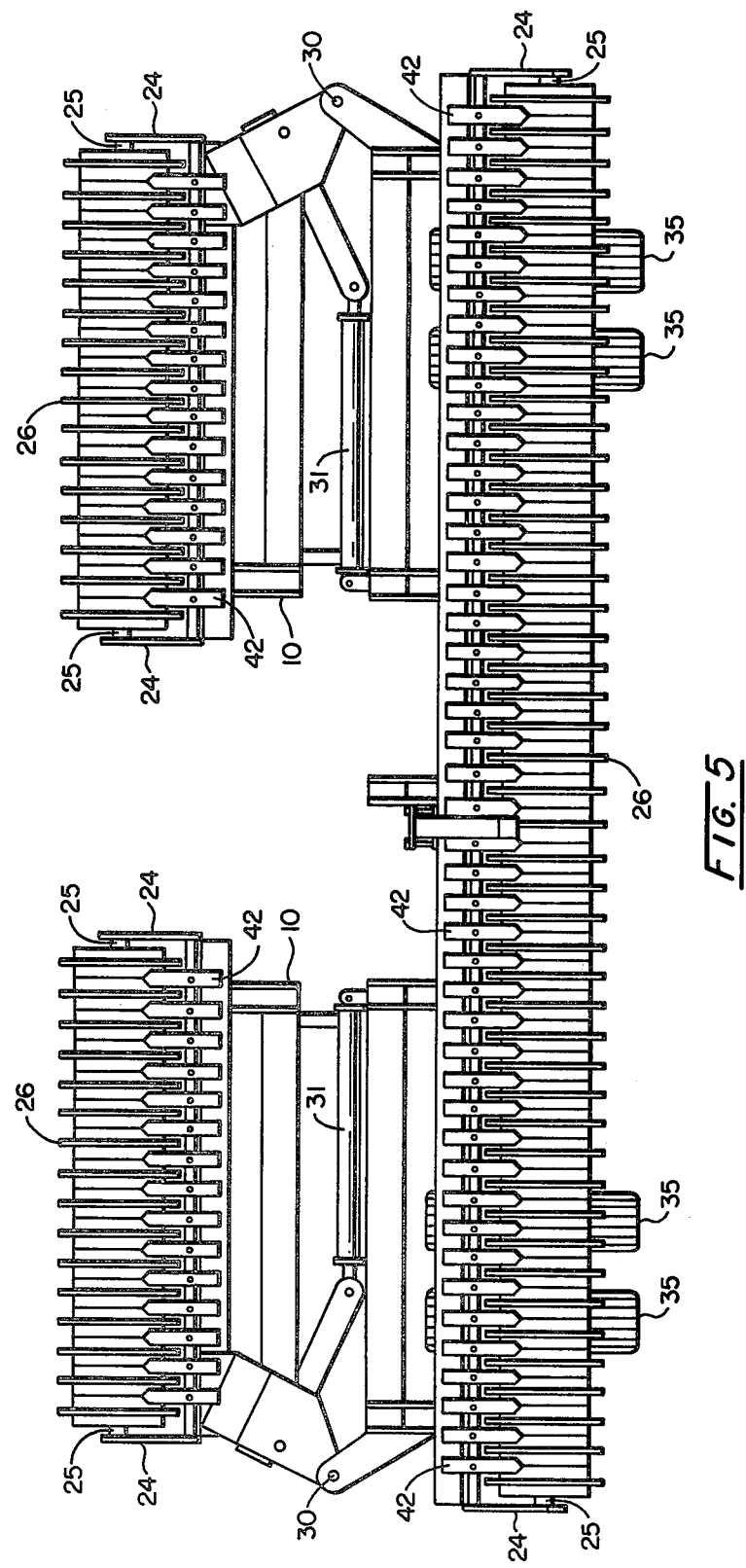

GROUND WORKING IMPLEMENT

BACKGROUND OF THE INVENTION

This invention relates to the art of agricultural machinery and more particularly to a new and improved apparatus for preparing a field for the planting of seed. In preparing soil for agricultural purposes, it is customary to first turn over the soil with a plow, then break up the soil particles with a disk harrow, and finally, condition the soil for planting with a drag harrow. The present invention in many instances, depending upon the soil conditions, can eliminate all of the above steps in that the device itself will permit the soil to be worked to a selected planting depth and leveled so that as the invention is pulled over the soil behind a tractor, a seed planting planter, commonly referred to as a drill, may be attached to the rear of the device and the entire soil preparation and seed planting operation can take place in one pass over the field. Additionally, fertilizers and pesticides may be incorporated into the soil in conjunction with the operation of this invention at the same time that the seeds are planted.

The pertinent prior art with which applicant is familiar are the following U.S. Pat. Nos. 2,607,176, McVickar; 3,054,462, Anderson; 3,006,422, Mighell; 4,180,005, Zumbahlen; and 4,227,581, Klotzbach. However, none of these show the unique combination of elements which derive the benefits that come from applicant's invention. These are a combination of S tines which may be moved vertically followed by packer wheels which will complete the process of breaking up the soil and leveling and so constructed with winged portions so that the device may be transported on the road and yet when operated spread out to its full 30 foot width.

SUMMARY OF THE INVENTION

It is therefore a primary object of this invention to provide a new and improved ground preparing apparatus for minimum-till planting.

It is a further object of this invention to provide a new and improved ground preparing apparatus utilizing S tines which may be raised or lowered vertically thus maintaining a constant angle of attack with respect to the soil so as to operate at maximum efficiency.

It is a still further object of this invention to provide such a device in combination with packer wheels which complete the soil preparation following initial contact between the S tines and the soil.

It is a still further object of this invention to provide such a ground preparing apparatus which in operable position will have an operating width of approximately 30 feet and yet will be capable of being folded up for road transport.

This, together with other objects and advantages of the invention, should become apparent in the details of construction and operation as more fully described hereinafter and claimed, reference being had to the accompanying drawings forming a part hereof wherein like numerals refer to like parts throughout.

BRIEF DESCRIPTION OF THE DRAWINGS

FIG. 2 is a side elevation view of the device with the support wheels fully retracted.

FIG. 3 is a side elevation view of the center section with portions of the device shown in phantom outline.

FIG. 4 is a side elevation view of the device with the wings in road transport position.

FIG. 5 is a rear elevation view of the ground working implement with the wings raised for road transportation.

DETAILED DESCRIPTION OF THE INVENTION

Figure 1:
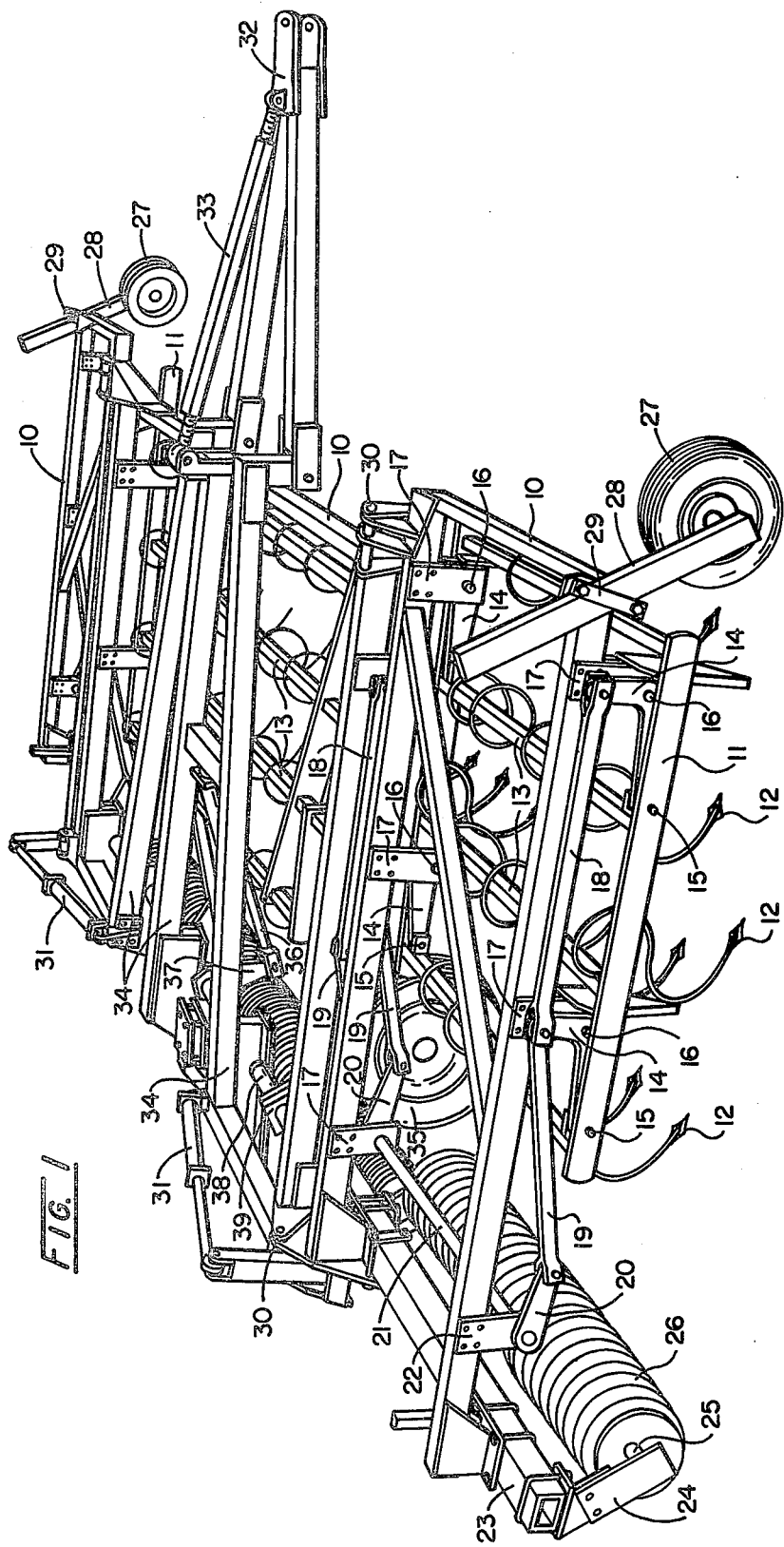
FIG. 1 is a perspective view of the ground working apparatus with the support wheels on the ground and the device raised above the ground but with the two wing portions fully extended.

Referring now more particularly to FIG. 1, the invention comprises three separate oblong frames 10—10 each of which is provided with a separate frame 11 from which depend a plurality of S tines 12—12. The outer two frames 10—10 are referred to as wing frames. Preferably there are four rows of S tines attached to bars 13—13 which are mounted transversely and fixedly attached to frame 11. Frame 11 in turn is supported by four bell cranks 14—14, each of which have one arm pivotally connected to frame 11 at pivot points 15—15. The bell cranks 14—14 are pivotally mounted at pivot points 16—16 on members 17—17 depending from frames 10—10. The other arms of bell cranks 14—14 are pivotally connected in pairs on either side of frames 10—10 by means of bars 18—18. Bars 18—18 in turn are pivotally connected to bars 19—19 which in turn are pivotally connected to arms 20—20 which are fixedly attached to shaft 21 which in turn is rotatable by means of a selectively reciprocal power source such as a hydraulic cylinder which is shown more clearly in FIG. 3. Shaft 21 is journaled in supports 22—22 which depend from frames 10—10. Fixedly attached to the rear of each frame 10 is a cross beam 23 from which depend struts 24—24 which in turn are journaled to receive the shaft 25 of packer wheel 26.

Each of the frames 10—10 are provided with these members, although, because of the viewing angle in FIG. 1, the detail can only readily be seen with respect to the frame 10 in the foreground of FIG. 1.

The outer wing frames 10—10 are provided with support wheels 27—27 which are attached to shafts 28—28 and are adjustable attached to the wing frames 10—10 by clamps 29—29. The support wheels 27—27 merely provide a leveling function at the outer edges of the wing frames 10—10. Each of the outer wing frames 10—10 are hingedly connected to the center frame 10 at hinges 30—30. Selectively reciprocal power sources 31—31, such as hydraulic cylinders, are attached to the wing frames 10—10 so as to enable the wing frames 10—10 to be folded over on top of the center frame 10 which is more than twice as wide as the wing frames 10—10, so as to enable the device to be transported on the road. An appropriate tongue 32 for attachment to a tractor is provided and its height may be adjusted by means of threaded member 33. The tongue 32 is connected to the center frame 10 by means of girders 34—34.

The device is transported on wheels 35—35 and may be raised completely out of contact with the ground by means of the hydraulic cylinder which is shown in FIG. 3. This cylinder also controls the depth of vertical movement and soil penetration of the S tines 12—12 in relationship to the packer wheels 26—26.

In FIG. 1 the transport wheels 35—35 are in ground transport position and tines 12—12, support wheels 27—27 and packer wheels 26—26 are out of contact with the ground and are about ten to 12 inches above the ground surface. The two outer wing frames 10—10 have not yet been folded up for road transport.

Referring now more particularly to FIG. 2, a side elevation view of the subject invention is shown. In this view the transport wheels 35—35 have been raised to their highest position and the S tines 12—12 are in their lowest position, which places the tips of the S tines 12—12 approximately six inches below the ground surface. The support wheels 27—27 are in proper position to support the outer edges of the two wing frames 10—10. It will be noted that the two wing frames 10—10 are positioned slightly ahead of the center wing frame 10 and that the packer wheels 26—26 of the wing frames 10—10 are slanted forwardly from the cross beam 23 while the packer wheel 26 associated with the center frame 10 is slanted rearwardly. The four rows of S tines 12—12 in the center frame 10 are positioned slightly behind the respective rows of S tines 12—12 in the wing frames 10—10.

Referring now more particularly to FIG. 3, which is a side elevation view of the center frame and attachments thereto, it will be noted that the transport wheels 35—35 are still in their fully raised position and the S tines 12—12 are in their lower most position. Shown in phantom outline is selectively reciprocal power source 36, such as a hydraulic cylinder, which is pivotally connected at its rear end to arm 37 which is also shown in partial phantom view and which is fixedly attached to shaft 38. Selectively reciprocal power source 36 is positioned approximately midway between sets of transport wheels 35—35. Transport wheels 35—35 are journaled in struts 39—39, also shown in phantom, which struts 39—39 in turn are fixedly attached to shaft 38. Arm 20a is connected to bar 19 which in turn is connected to bar 18 and is used to vertically raise or lower the S tines 12—12 in the center frame 10. Arm 20b is connected to L-shaped member 40 also partially shown in phantom. However, L-shaped member 40 is positioned in front of the center frame 10 and actually is connected to member 20 which in turn is connected to shaft 21 of the outer wing frame 10. Threaded member 41 permits the tines 12—12 on frame 10 to be raised or lowered by means of cylinder 36 since it forms a rigid connection between shaft 38 and shaft 21 yet also permits wing frames 10—10 to be rotated around hinge 30 for road transport, and thus constitutes an articulated adjustable connection. Threaded member 41 may be disconnected from arm 20a and rotated on its threaded connections to effect adjustment between shaft 38 and shaft 21. This arrangement will be better understood by reference to FIG. 4.

Referring now more particularly to FIG. 4, the invention is shown in side elevation view with the wing frames 10—10 in transport position with wheels 35—35 in their lower position and S tines 12—12 and packer wheels 26—26 raised above the ground surface. In this view the relationship between rotatable shaft 38, arms 20a and 20b, connecting member 41, L-shaped member 40, and arm 20 are more clearly seen.

With the wing frames 10—10 rotated around hinges 30—30 and down in operable position, retraction of the selectively reciprocal power source 36 causes retraction of transport wheels 35—35 and rotation of arm 20b in a counterclockwise direction thus causing S tines 12—12 in center frame 10 to move downwardly. It will be noted that consequent counterclockwise rotation of arm 20a and movement of L-shaped member 40 will cause rotation of shaft 21 and thus through linkage 20, 19, and 18, a lowering of tines 12—12 located in the wing frames 10—10.

Referring now more particularly to FIG. 5, there is shown a rear view of the invention in transport position with the transport wheels 35—35 lowered. The wing frames 10—10 have been rotated around hinges 30—30 by means of selectively rotatable power sources 31—31 a full 180° for road transport. Also shown are scrapers 42—42 which prevent the accumulation of any undesired soil in packer wheels 26—26.

In operation, the invention is transported to the field to be cultivated in the transport position shown in FIGS. 4 and 5. The device is then placed in operating position by actuating the selectively reciprocal power sources 31—31 so as to place the wing frames 10—10 in position so that the packer wheels 26—26 and the Danish tines 12—12 may engage the ground.

Selectively reciprocal power source 36 is then actuated to raise the transport wheels 35—35. One or more seed drills may be attached to the rear of the roller tine apparatus with the tractor attached to the tongue 32, the height adjusted by means of threaded member 33 and with the support wheels 27—27 adjusted to the appropriate position, the device is ready for operation. Thus the soil may be prepared for planting and planting actually occurs in one pass over the field with this device.

While this invention has been described in its preferred embodiment, it is appreciated that variations thereon may be made without departing from the proper scope and spirit of the invention.

What is claimed is:

1. A ground working implement comprising:
   three first rectangular frames, each of which is connected at its rear side to a rotatable packer wheel extending substantially the entire length of said rear side of said first frame;
   each of two of said first frames being connected on one of their sides by hinges to the remaining said first frame;
   each of said first frames being provided with a second frame connected thereto by a plurality of bell cranks forward of said packer wheel;
   downwardly extending tines attached to said second frame;
   said bell cranks being connected to a first lever arm which in turn is connected to a second lever arm;
   a rotatable shaft supported on each of said first frames connected to said second lever arm;
   said rotatable shafts connected together for concurrent rotation;
   a selectively reciprocal power source connected to a third lever arm which in turn is connected to said shaft on said remaining first frame;
   ground support means connected to said shaft on said remaining first frame;
   a hitch extending from the end of said remaining first frame opposite to the rear side supporting said packer wheel and adapted to be attached to a traction device; and
   means for rotating said two first frames so that they will be supported on the said remaining first frame for road transport.

2. The ground working implement of claim 1 wherein said tines are attached to bars extending transversely across said second frame parallel to the axis of said packer wheel.

3. The ground working implement of claim 2 wherein said tines are S tines.

4. The ground working implement of claim 1 wherein said bell cranks are fulcrumed on members depending from each of said first rectangular frames and are pivotally connected to said second frames and to said first lever arm.

5. The ground working implement of claim 1 wherein said rotatable shafts on each of said two first frames are connected to the rotatable shaft on said remaining first frame by an articulated adjustable connection.

6. The ground working implement of claim 5 wherein said adjustable articulated connection includes a threaded connection.

7. The ground working implement of claim 4 wherein horizontal movement of said lever arm when actuated by the rotation of said shaft results in vertical movement of said tines.

8. The ground working implement of claim 1 wherein said collectively reciprocal power source is a hydraulic cylinder.

* * * * *